United States Patent
Ritter et al.

(10) Patent No.: US 7,528,505 B2
(45) Date of Patent: May 5, 2009

(54) SYSTEMS AND METHODS FOR BALANCING OF DC LINK IN THREE LEVEL PWM POWER CONVERSION EQUIPMENT

(75) Inventors: Allen Michael Ritter, Roanoke, VA (US); John Douglas D'Atre, Vancouver, WA (US); Cyrus David Harbourt, Roanoke, VA (US); Rafael Ignacio Bedia, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 314 days.

(21) Appl. No.: 11/535,954

(22) Filed: Sep. 27, 2006

(65) Prior Publication Data
US 2008/0074907 A1 Mar. 27, 2008

(51) Int. Cl.
*H02J 1/00* (2006.01)
(52) U.S. Cl. ...................................... 307/82
(58) Field of Classification Search ............... 307/82
See application file for complete search history.

(56) References Cited

U.S. PATENT DOCUMENTS

| | | | | |
|---|---|---|---|---|
| 3,989,996 A | * | 11/1976 | Stacey | 363/10 |
| 6,154,378 A | * | 11/2000 | Peterson et al. | 363/37 |
| 2007/0228837 A1 | * | 10/2007 | Nielsen et al. | 307/82 |

* cited by examiner

*Primary Examiner*—Robert L. Deberadinis
(74) *Attorney, Agent, or Firm*—Sutherland Asbill & Brennan LLP

(57) ABSTRACT

A power converting apparatus and method providing for the addition of a fourth power connection wire to the neutral point of the normal three phase load circuit. This allows delivery of combined current from the center of the DC link voltage to load. The added control enables a third harmonic injection to flow and allows for increased power rating per peak amp handled by the conversion system. Limiting of faults to the positive half versus the negative half of the DC system allows for more robust behavior when encountering these fault conditions.

7 Claims, 1 Drawing Sheet

SYSTEMS AND METHODS FOR BALANCING OF DC LINK IN THREE LEVEL PWM POWER CONVERSION EQUIPMENT

TECHNICAL FIELD

The present application relates generally to power conversion systems and more particularly relates to enhanced voltage balance maintenance through use of additional power lines.

BACKGROUND OF THE INVENTION

In prior power conversion systems, the insertion of common mode voltage was used to re-center DC balance. An example of a power conversion system is General Electric Company's 3300 volt IGCT converter system. A need exists to improve the system performance and ratings as poor noise to signal ratios can occur during certain settings, such as low power levels. The distribution of power extracted from the positive half and negative half DC link capacitance in a three-level pulse with modulation ("PWM") system does not afford consistent balanced operation in light of disturbance that instantaneously modifies the positive versus negative power that flows in the load. The maintenance of voltage balance in a three-level PWM power conversion system is shown to be enhanced by the addition of a power carrying fourth wire connected to the normal three phase load circuit.

The level of peak current that is required to convert a certain level of power acts as a limitation for application of the conversion system. Changes in this conversion factor always effects the application of the power converter. An additional benefit to the use of this fourth connection is that the addition of a third harmonic injection current can increase the level of output power without increasing the peak level of current that the converter must handle.

Added protection in the form of a fault handling reaction is typical to subdue excessive system voltage from reaching portions of the system. This type of fault handling can be streamlined by the added separation afforded by this proposed solution. Added system robustness is achieved since the fault handling events that had to be used to protect the conversion equipment for certain fault conditions are now limited to only the positive or negative half of the power conversion configuration and thus the converters can be designed to tolerate such faults without the need for the diversion of system voltage.

There is a desire, therefore, for an improved power conversion system which improves signal to noise ratio when power flow is low, when the voltage is high, or when the rate of change of power is high while effecting consistent balanced operation.

SUMMARY OF THE INVENTION

The present application thus provides for the addition of a fourth power connection wire to the neutral point of the normal three phase load circuit. This allows delivery of combined current from the center of the DC link voltage to load. The added control enables a third harmonic injection to flow and allows for increased power rating per peak amp handled by the conversion system. In addition, limiting faults to the positive half versus the negative half of the DC system provides for more robust behavior when encountering these fault conditions.

A power converting apparatus in accordance with an embodiment of the present invention may include an inverter. The inverter may be able to convert alternating current voltages to a direct current phase voltage having three potentials. The potentials for the direct current phase voltage include positive, neutral and negative potentials. The inverter may be an IGCT-type inverter. Alternatively, the inverter may be an IGBT-type inverter.

The power converting apparatus may further include a plurality of alternating current power sources connected to a three-phase load circuit. Typical configurations of the apparatus will include three such power sources.

The power converting apparatus may contain a plurality of power loads to synthesize direct current waveforms output from the inverter so that the direct current waveforms approximate alternating current waveforms.

The power converting apparatus may include a direct current power carrying wire. This power carrying wire provides power via the synthesized waveforms to a neutral point connection on the three-phase load circuit.

The power converting apparatus may allow for fault event handling procedures. In certain embodiments of the present invention, the events may be limited to the positive half of the apparatus configuration. Alternatively, the events may be limited to the negative half of the apparatus configuration. Resultantly, the power converting apparatus may handle fault events without a diversion of apparatus voltage.

The present application further may provide for a method of converting power through the operation of a power conversion apparatus. The method may provide for converting alternating current voltages to a direct current phase voltage having three potentials, including a positive, neutral, and negative potential. The method may further connect a plurality of alternating current power sources to a three-phase load circuit Furthermore, the method may allow for the synthesizing of output direct current waveforms with a plurality of power loads so that the direct current waveforms approximate alternating current waveforms. A carrying wire may be connected to the neutral point of the three-phase load circuit and carry the synthesized waveforms.

These and other features of the present application will become apparent to one of ordinary skill in the art upon review of the following detailed description when taken in conjunction with the drawings and appended claims.

DETAILED DESCRIPTION

Figure 1:
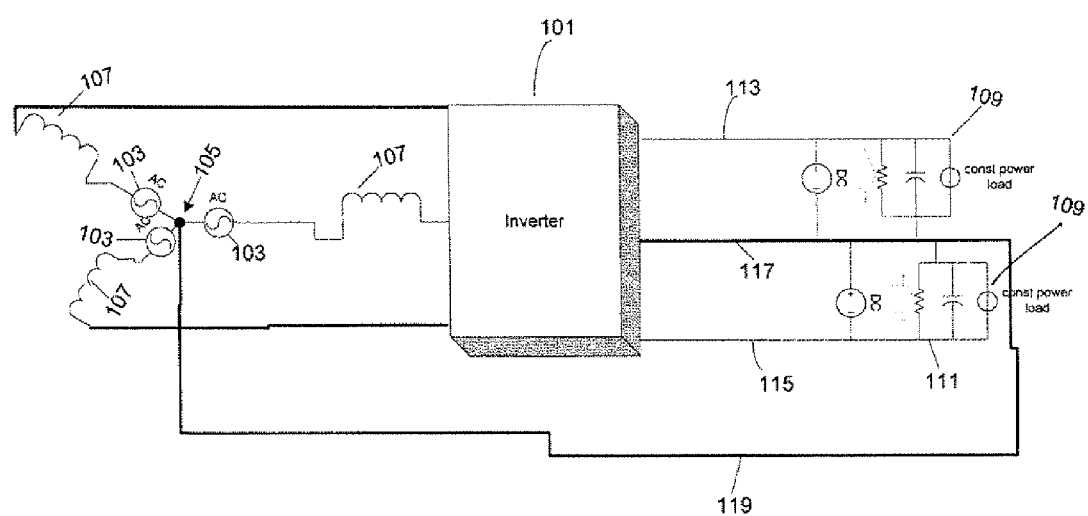
FIG. 1 is an exemplary representation of a power converting apparatus in accordance with certain embodiments of the present invention as described herein.

Referring now to the drawing, in which like numbers refer to like elements throughout, FIG. 1 shows an inverter 101. The inverter 101 as shown operates to convert alternating current ("AC") input load into usable direct current ("DC") output. The inverter 101 is preferably a PWM inverter, such as an IGCT-type or IGBT-type inverter. The inverter 101 may receive AC input loads from AC power sources 103. These AC power sources may transmit the AC power through an inductor 107 before reaching the inverter 101. Specifically, the inductor 107 operates as a conductor used for introducing inductance into the electrical circuit. Various types and models of inverters 101 may be used in connection with the present described invention.

As is shown, the AC power sources 103 may be connected through use of a three-phase load circuit 105. The AC power output resultant from the load circuit 105 is input into the inverter 101. This allows the inverter 101 to operate in a three-level mode. As a result, the inverter provides three DC outputs. First, the power line 113 may carry the positively charged output. Accordingly, the power line 115 may carry the negatively charged output. Lastly, power line 117 may serve as a neutral output line.

The outputs of the inverter 101 provide power to DC constant power loads 109. These power loads 109 may operate to synthesize output DC waveforms so that the DC waveforms approximate AC waveforms. These outputs may be carried via the power line 119. The resultant DC power load is carried back to a neutral point of the three-phase load circuit 105. The connection of this power carrying wire 119 to the three-phase load circuit 105 operates to maintain the voltage balance in the three-level pulse-width modulation power conversion system.

Furthermore, the connection of power line 119 back to the three-phase load circuit 105 provides that the addition of a third harmonic injection current can increase the level of output power without increasing the peak level of current that the inverter 101 must handle.

Additionally, the connection of power line 119 back to the three-phase load circuit 105 operates to improve the robustness of the overall power conversion system. This added robustness is achieved as fault handling events that are used to protect the conversion equipment in the event of certain fault conditions are simplified. The addition of power line 119 to the three-phase load circuit 105 allows the crowbar events to be limited to only the positive or negative half of the overall power conversion configuration. This allows the system to be design as such to tolerate these fault events without the need for a diversion of system voltage.

It should be apparent that the foregoing relates only to the preferred embodiments of the present application and that numerous changes and modifications may be made herein by one of ordinary skill in the art without departing from the generally spirit and scope of the invention as defined by the following claims and equivalents thereof.

We claim:

1. A power converting apparatus comprising:
    a pulse width modulation inverter for converting alternating current voltages to a direct current phase voltage having three potentials, including a positive, neutral, and negative potential;
    a plurality of alternating current power sources connected to a three-phase load circuit;
    a plurality of power loads to synthesize output direct current waveforms of the inverter so that the direct current waveforms approximate alternating current waveforms; and
    a carrying wire connected to the neutral point of the three-phase load circuit carrying the synthesized waveforms and injection current.

2. The power converting apparatus of claim 1, where the inverter is an IGCT-type inverter.

3. The power converting apparatus of claim 1, where the inverter is an IGBT-type inverter.

4. The power converting apparatus of claim 1, wherein fault events are limited to a positive half of the power converting apparatus.

5. The power converting apparatus of claim 1, wherein fault events are limited to a negative half of the power converting apparatus.

6. The power converting apparatus of claim 1, wherein fault events are handled without a diversion of apparatus voltage.

7. A method of converting power through the operation of a power conversion apparatus comprising:
    connecting a plurality of alternating current power sources to a three-phase load circuit;
    converting alternating current voltages from the alternating current power sources to a direct current phase voltage waveforms having three potentials, including a positive, neutral, and negative potential:
    synthesizing the direct current waveforms with a plurality of power loads so that the direct current waveforms approximate alternating current waveforms; and
    providing a carrying wire between the neutral potential and a neutral point of the three-phase load circuit carrying the synthesized waveforms and injection current.

* * * * *